US008249534B2

(12) United States Patent
Lindgren

(10) Patent No.: US 8,249,534 B2
(45) Date of Patent: Aug. 21, 2012

(54) METHOD FOR INTERFERENCE REJECTION

(75) Inventor: Ulf Lindgren, Västra Frölunda (SE)

(73) Assignee: Telefonaktiebolaget L M Ericsson (Publ), Stockholm (DE)

(*) Notice: Subject to any disclaimer, the term of this patent is extended or adjusted under 35 U.S.C. 154(b) by 275 days.

(21) Appl. No.: 12/745,801

(22) PCT Filed: Dec. 3, 2007

(86) PCT No.: PCT/SE2007/001079

§ 371 (c)(1),
(2), (4) Date: Jun. 2, 2010

(87) PCT Pub. No.: WO2009/072934

PCT Pub. Date: Jun. 11, 2009

(65) Prior Publication Data

US 2010/0255804 A1 Oct. 7, 2010

(51) Int. Cl.
*H04B 17/00* (2006.01)

(52) U.S. Cl. .................... 455/226.1; 455/278.1; 455/272

(58) Field of Classification Search .... 455/226.1–226.4, 455/272–279.1; 343/833, 834; 342/373
See application file for complete search history.

(56) References Cited

U.S. PATENT DOCUMENTS

| | | | | |
|---|---|---|---|---|
| 5,542,101 | A | 7/1996 | Pal et al. | |
| 7,391,386 | B2 * | 6/2008 | Sawaya et al. | 343/833 |
| 2005/0159187 | A1 * | 7/2005 | Mendolia et al. | 455/278.1 |
| 2006/0232492 | A1 * | 10/2006 | Sawatani | 455/272 |
| 2007/0054646 | A1 * | 3/2007 | Smith | 455/272 |
| 2011/0025560 | A1 * | 2/2011 | Crozzoli et al. | 342/373 |

* cited by examiner

*Primary Examiner* — Lana N Le

(57) ABSTRACT

The present invention relates to a method for identifying components in a telecommunication system, which method comprises representing a uniform linear array, ULA, antenna, having at least two antenna elements, by an array factor polynomial comprising at least two terms, each term having a certain weight (Wk); setting said weights (WK) to desired values such that a desired antenna radiation pattern is acquired. Furthermore, the method comprises the steps: changing the desired weights such that a number of sets of desired weights (Wk) is acquired, such that the ULA antenna scans a spatial portion, a certain scan corresponding to a certain set of desired weights, analyzing a received signal (h0) being represented by a received array factor polynomial having terms with certain received weights, which is parameterized by at least one pole; and using each corresponding set of desired weights (Wk) and received weights to determine the pole parameterization.

7 Claims, 3 Drawing Sheets

METHOD FOR INTERFERENCE REJECTION

TECHNICAL FIELD

The present invention relates to a method for identifying components in a telecommunication system, which method comprises the steps: representing a uniform linear array, ULA, antenna, having at least two antenna elements, by an array factor polynomial, the polynomial comprising at least two terms, each term having a certain weight and setting said weights to desired values such that a desired antenna radiation pattern corresponding to a desired array factor polynomial is acquired for the ULA antenna.

BACKGROUND

In telecommunication, one or more base station communicates with mobile stations such as mobile phones and laptops. Typically, a mobile station is modelled by a so-called cluster of local scatterers. This cluster is a collection of scatterers which are close to the transmitting mobile station, where the term "close" shall be interpreted as a distance which corresponds to a time which is much smaller than the symbol time. The scatterers constituting a cluster will, as their numbers grow, create a signal distribution, here termed azimuth spread.

A receiving base station will receive signals from scatterers, producing angular dependent distributions of signals. Typically, such a distribution is termed Power Azimuth Spread (PAS). A specific direction may, for example, be comprised of disturbing signals, producing an angular dependent distribution of the transmitted signals.

This results in a general problem with interference in a wireless multi-user communication system. The interference often limits the capacity of the system. There exists several well-known ways to handle interference, for example by using beam-forming.

However, beam-forming is mainly dealing with focusing a gain function in a certain direction. This function is derived subject to a direction, in which some desired signal is presumed to be. An interfering signal may lay in a close neighborhood (azimuth) to the desired signal, causing problems.

There is thus a need for reducing such interference without the disadvantages of prior art solutions. To achieve this, a simple and effective way to analyze the channel is needed.

SUMMARY

The object of the present invention is to disclose a simple and effective method for analyzing a channel in a telecommunication system, which in turn makes it possible to reduce interference, for example due to other transmitters.

This object is solved by a method as mentioned initially. Furthermore, the method comprises the steps: changing the desired weights such that a number of sets of desired weights is acquired, such that the ULA antenna scans a spatial portion, a certain scan corresponding to a certain set of desired weights, and the number of scans at least being equal to the number of antenna elements in the ULA antenna; analyzing a received signal obtained from said scans, the received signal being represented by a received array factor polynomial comprising at least two terms, each term having a certain received weight, such that a received set of weights is acquired, the received set of weights being constituted by the desired set of weights scaled and rotated, the received array factor polynomial further being parameterized by at least one pole; and using each corresponding set of desired weights and received weights to determine the pole parameterization.

According to a preferred embodiment, the desired array factor polynomial is parameterized by at least two zeroes, where at least one zero is used for cancelling out a pole by altering the desired weights such that said zero is moved to said pole.

Preferably, each pole corresponds to a disturbance enabling each disturbance to be cancelled out by cancelling out its corresponding pole.

According to another preferred embodiment, the expression for the received signal in the spatial domain is derived by means of a least square method or a Fourier transform.

A number of advantages are acquired by means of the present invention. For example, a simple and effective method for analyzing a channel in a telecommunication system is obtained.

BRIEF DESCRIPTION OF THE DRAWINGS

The present invention will now be described more in detail with reference to the appended drawings, where.

DETAILED DESCRIPTION

Generally, an alternative model for a disturbing signal from a scatterer is a source of power in the angular spectra. The source can be modelled by introducing a pole model in the angular domain. An antenna array can from a system function perspective be represented by zeros in a complex plane. Likewise, a pole can be inserted in that plane. This means that for a single pole, the angle with respect to the real axis defines the direction and the distance from the origin defines the spread. Inherent in the pole model lays the fact that it represents a cluster with infinitely many scatterers, yet modelled by one parameter.

Figure 1:
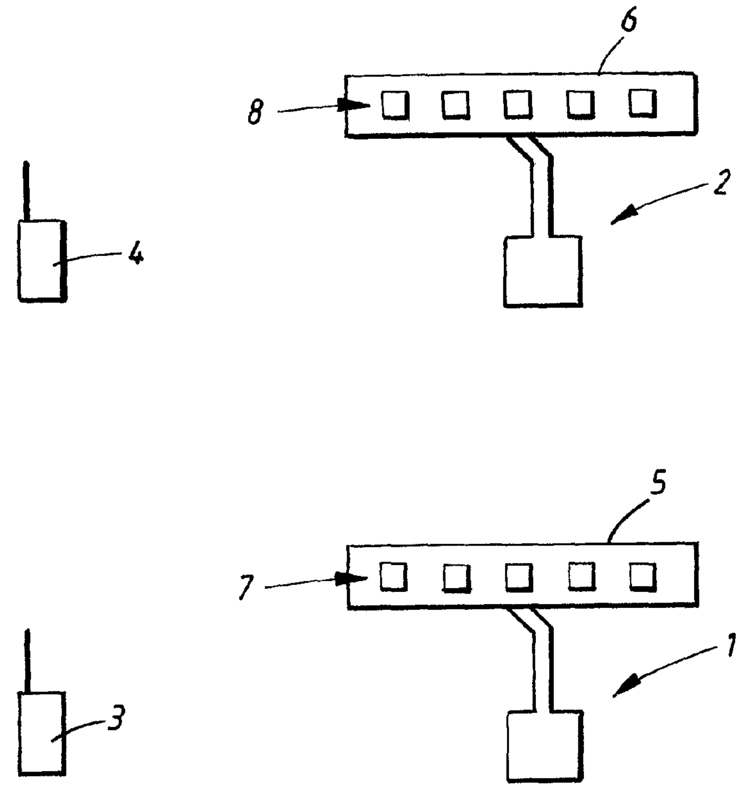
FIG. 1 shows a base station in a cluster.

A description of an embodiment of the present invention will now be given more in detail, with reference to FIG. 1.

In a certain area, there is a first base station 1 and a second base station 2. The base stations 1, 2 are arranged to communicate with mobile stations 3, 4. The first base station 1 and the second bas station comprise a uniform linear array, ULA, antenna 5, 6, respectively. Each antenna 5, 6 comprises a number of linearly arranged antenna elements 7, 8 having an upper side and a lower side, where a ground plane is placed below the antenna elements' lower side.

The first base station 1 experiences disturbances, both mobile and non-mobile disturbances, where the second base station 2 constitutes a non-mobile disturbance.

Practically, each element in first base station's ULA antenna 5 is fed directly from a respective radio chain, being arranged for both transmission and reception. By delaying signals and giving them certain amplitudes, the ULA antenna 5 is electrically controlled. In a model, the ULA antenna's array factor H can be written as:

$$H=\sum_{k=0}^{K-1}\left(w_k e^{\frac{j2\pi dk}{\lambda}\cos\theta}\right) \tag{1}$$
$$=\left\{z=e^{\frac{j2\pi dk}{\lambda}\cos\theta}\right\}$$
$$=\sum_{k=0}^{K-1}(w_k z^k)$$
$$=w_{K-1}z^{K-1}+\ldots+w_1 z+w_0$$

where d is the spacing between the antenna elements in the ULA antenna, λ is the present wavelength, θ is the present angle in azimuth around the horizontally arranged ULA antenna, $w_k$ is each a weight for each antenna element, defining its electrical control, and K is the number of antenna elements in the ULA antenna.

In equation (1), the term cos θ can be substituted be a more general function trig θ, where trig θ is a trigonometric function of θ that depends on the coordinate system used when setting the weights $w_k$.

The array factor H can be written as a product of sums according to $$H=(z-z_0)(z-z_1)\ldots(z-z_{K-1}), \tag{2}$$

which corresponds to that the array factor H has a number of nulls $z_0$, $z_1$, . . . $z_{K-1}$, where each null corresponds to a low degree of coverage in the azimuth direction corresponding to that null.

If the array factor H is written as a spatial function by means of inverse z-transformation, we obtain an impulse function h(n) according to:

$$h(n)=\sum_{k=0}^{K-1}(w_k\delta(n-k)), \tag{3}$$

where n is a spatial variable and δ(n−k)=1 for n=k, otherwise δ(n−k)=0.

Hence $h(0)=w_0$; $h(1)=w_1$ etc.

By setting the weights $w_k$ properly, a desired antenna radiation pattern is acquired for a certain set of weights $w_{K-1}$ . . . $w_0$.

According to the present invention, the ULA antenna 5 is scanned in a spatial region, preferably in azimuth from −90° to 90°, where the normal to the antenna elements' upper side extends in the azimuth direction 0°, since the surroundings behind the antenna's ground plane is of lesser interest. The scanning comprises a number of scans and takes place by changing the set of weights $w_{K-1}$ . . . $w_0$ in such a way that the desired antenna radiation pattern is rotated around the ULA antenna 5 in the azimuth plane. For each scan, a certain set of weights is used, and for each set of weights the ideal, desired, antenna radiation pattern is known. One way of achieving this is to use the weights $w_k=e^{jk\beta}$, where β is the pointing direction.

The scanning takes place in reception, i.e. the ULA antenna 5 is used as a receiving antenna, and for each scan, e.g. a new value for β, a complex received result is obtained. A collection of complex received results generates a complex curve termed a total received result. The total received result is compared with the theoretical antenna diagram. Based on a comparison, disturbances may be determined.

By determining a disturbance, in a preferred aspect of the present invention, it may more or less be cancelled out by changing the set of weights such that for the position of each detected disturbance, a null of the ULA antenna is positioned there. Hence, the maximum number of disturbances that may be cancelled in this way equals the number of elements minus one.

The procedure according to the present invention will now be disclosed more in detail.

The ULA antenna 5 scans a certain spatial region. Azimuthal scanning implies that the ULA antenna's antenna diagram is convolved with the angular spectrum of the channel. Transforming the problem to the spatial domain means that an observed spatial impulse response is acquired.

A disturbance may be modelled as an infinite array antenna. In an embodiment example, the disturbing second base station 2 may be represented by a spatial disturbance expression $$h_c(n)=c^n,\ c\in\mathbb{C} \tag{4}$$

The received signal is referred to as an observed signal $h_o(n)$. Provided that the disturbance has an angular spread, in the spatial domain, the observed signal $h_o(n)$ is regarded as a multiplication between the array factor $$h(n)=\sum_{k=0}^{K-1}(w_k\delta(n-k))$$

and the disturbance $h_c(n)=c^n$. In the angular domain, this means that the antenna diagram is convolved with the angular spectrum of the disturbance, which has a smearing effect on the original antenna diagram.

Here, in the spatial domain, for a certain antenna diagram having a certain known appearance and pointing angle for its main beam due to the setting of the weights $w_k$, the expression for the total observed, received, signal $h_o(n)$ is:

$$h_o(n)=\sum_{k=0}^{K-1}(w_k\delta(n-k))h_c(k) \tag{5}$$
$$=\sum_{k=0}^{K-1}(w_k c^k\delta(n-k))$$
$$=\sum_{k=0}^{K-1}\left(w_k(|c|e^{j\arg c})^k\delta(n-k)\right).$$

When $h_o(n)$ is transformed into the z-plane, the corresponding signal $H_o(z)$ is written as $$H_o(z)=\sum_{k=0}^{K-1}\left(w_k(|c|e^{j\arg c})^k z^k\right) \tag{6}$$
$$\sum_{k=0}^{K-1}\left(w_k(|c|e^{j\arg c}z)^k \Rightarrow H_o(\tilde{z})\right.$$
$$\sum_{k=0}^{K-1}(w_k\tilde{z}^k),$$

where $\tilde{z}=|c|e^{j\arg c}z$ and z is a complex variable of the angular domain.

The expression $H_o(\tilde{z})$ comprises the factors $w_k$ which are scaled by |c| and rotated by arg c. |c| relates to the width of the disturbance, and arg c corresponds to the azimuth direction to the disturbance. In order to find these parameters, c will be calculated. The described method is one of many possible system identification methods and serves as an example.

The expression in equation (5) relates to one single pole. Generally the number of poles for which the present invention is applicable is L, where L≦K−2. Thus a general expression for the poles is $$\sum_{l=0}^{L} C_l^k,$$

where L≦K−2. Inserting this general expression into equation (5) results in a more general equation for the total observed, received, signal $h_o(n)$ in the spatial domain:

$$h_o(n) = \sum_{k=0}^{K-1}\left(w_k\left[\sum_{l=0}^{L} c_l^k\right]\delta(n-k)\right) = \sum_{k=0}^{K-1}\left(w_k\left[\sum_{k=0}^{K-1}(|c_l|e^{jargc_l})^k\right]\delta(n-k)\right), \quad (7)$$

where L≦K−2.

In the following, an example where one pole is present is discussed. In order to use equation (5) for determining $h_o$, a number of observations are inserted.

$$h_o(0)=w_0c^0=w_0$$

$$h_o(1)=w_1c^1$$

Division yields $$\frac{h_0(0)}{h_0(1)} = \frac{w_0}{w_1 c} \Rightarrow c = \frac{w_0 h_0(1)}{w_1 h_0(0)} \quad (8)$$

where all terms on the right side are known. Given a known pointing direction, β, and, for example, $w_k=e^{jk\beta}$, it follows from insertion that the angle of c is relative to the pointing direction.

In the same way, for two following observations, a corresponding division yields $$\frac{h_0(1)}{h_0(2)} = \frac{w_1 c}{w_2 c^2} \Rightarrow c = \frac{w_1 h_0(2)}{w_2 h_0(1)}. \quad (9)$$

The theoretical terms $h_0(k)$ normally contains a certain amount of noise. This means that the calculated value of c, being dependent of observed terms $\tilde{h}_0(k)$ will vary with the noise. In order to calculate c more accurately, a maximum likelihood estimation is preferable performed. Assuming that the noise is white Gaussian noise, the following expression may be used:

$$\frac{\partial L(c)}{\partial c} = \sum_{k=0}^{K-1} kc^{k-1}\left(\tilde{h}_0(k) - c^k\right) \quad (10)$$

Here, the function L is a log likelihood function. Clearly this equation is non-linear, and one way to solve it is by means of a Newton search.

Figure 2:
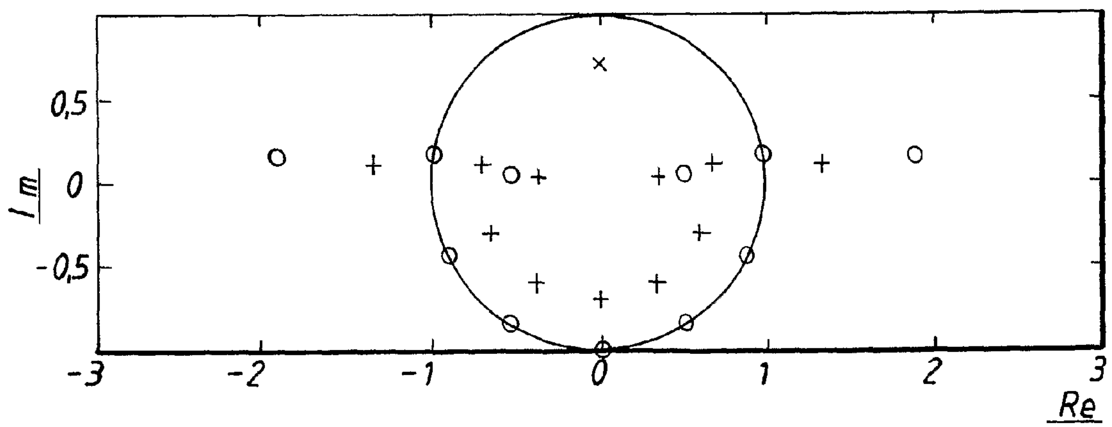
FIG. 2 shows a plot of an azimuth plane.
Figure 3:
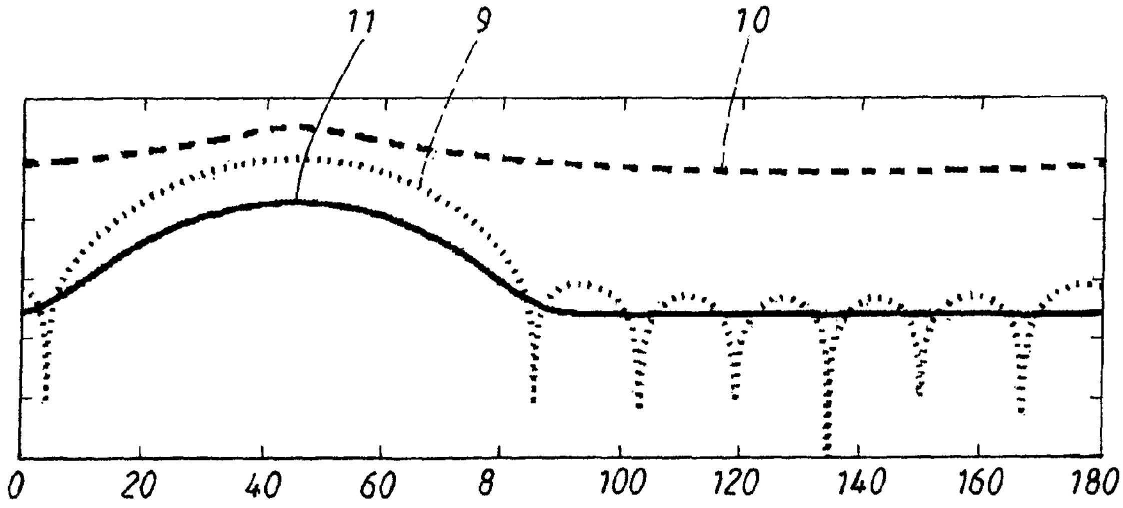
FIG. 3 shows a plot of a first set of antenna diagrams.

In FIG. 2 and FIG. 3, the effect a disturbance has on the ideal antenna diagram is shown graphically. FIG. 2 depicts the azimuth plane where the ideal ULA is represented by its zeros indicated by the symbol ○. In FIG. 3, a corresponding antenna diagram is shown as a dotted curve 9. This curve 9 corresponds to the ideal array factor according to equation (1).

A disturbance, modeled as a pole, is shown in FIG. 2 as a x mark and the corresponding angular spectrum is the dashed curve 10 in FIG. 3. The disturbance corresponds to the expression in equation (4).

When a scanning in azimuth is performed, as described in the spatial domain with the impulse function in equation (5) above, this results in an angular spectrum shown by the solid curve 11 in FIG. 3, i.e. it is a total observed, received, signal. This spectrum corresponds to the array zeros shown in FIG. 2 with the symbol +. The resulting configuration of zeroes, corresponding to the total observed, received, signal 11, is a contraction of the original configuration.

According to a preferred aspect of the present invention, generally, since the antenna 5 is represented by a set of zeros, one or some of the zeros can be moved to cancel one or many poles. In other words, placing a zero on every pole which originates from the second disturbing base station 2 eliminates the effect of that disturbing base station 2. The information needed is derived from one or many complex numbers as c, which is derived for the case of one disturbing PAS according to the above, see equations (7) and (8).

By means of z-transform, equation (4) can be written as $$H_c(z) = \frac{1}{1 + cz^{-1}}, \quad (11)$$

and when c is known, equation (1) may be written as $$H(z)=(1+cz^{-1})(\tilde{w}_{K-2}z^{-K+2}+ \ldots +\tilde{w}_0). \quad (12)$$

This means that for the observed, received, signal, the following expression corresponding to equation (6) may be written:

$$H_o(z) = \frac{(1 + cz^{-1})(\tilde{w}_{K-2}z^{-K+2} + \ldots + \tilde{w}_0)}{(1 + cz^{-1})} = (\tilde{w}_{K-2}z^{-K+2} + \ldots + \tilde{w}_0) \quad (13)$$

Here, the last term on the right-hand side of equation (11) relates to the resulting antenna radiation pattern when one zero has been used to cancel out one pole.

Figure 5:
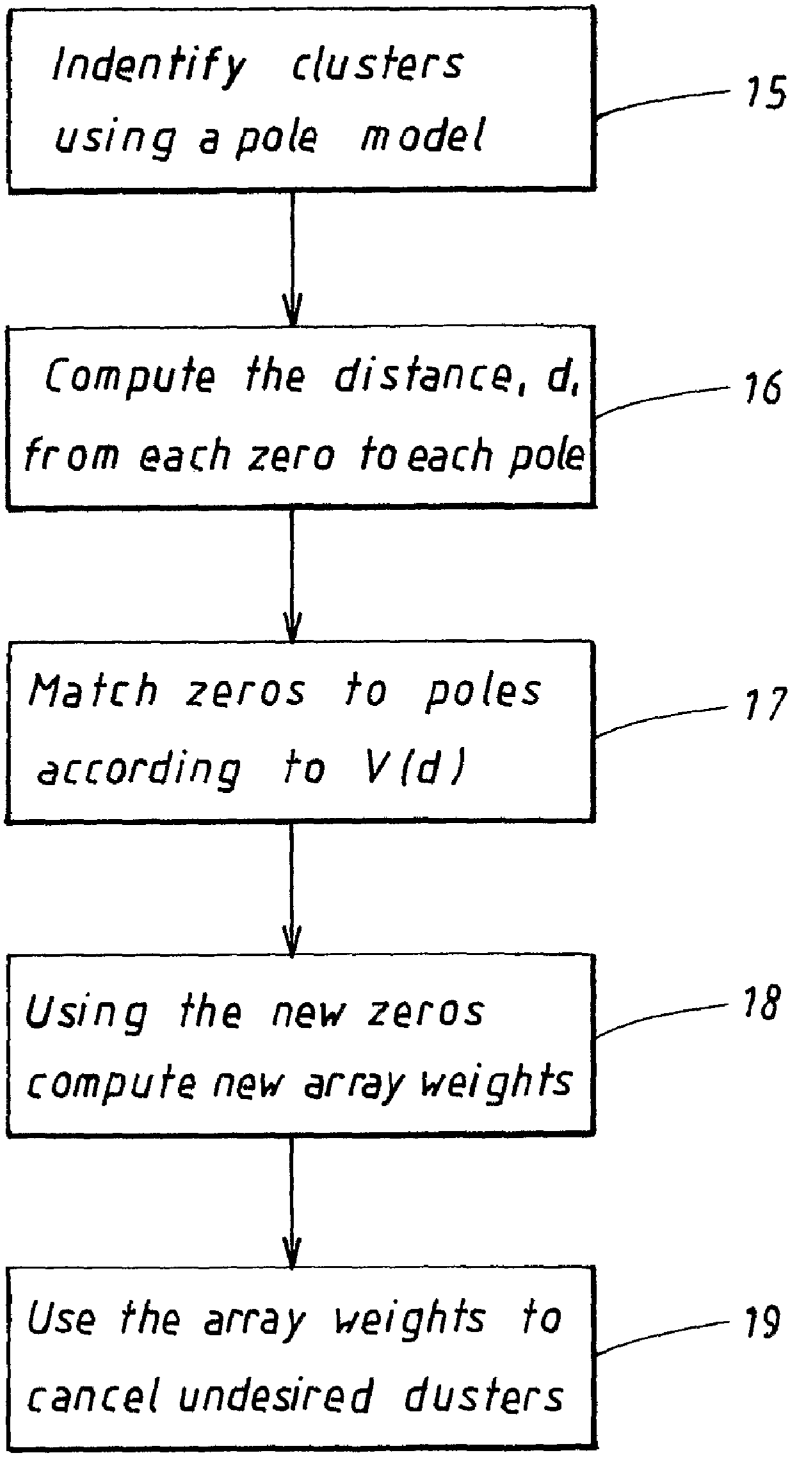
FIG. 5 shows a flow-chart describing a preferred set of method step for carrying out the present invention.

Since each zero cancelling a pole can be regarded as lost, the remaining zeroes constitute the basis for the antenna diagram. Using the example illustrated in FIG. 2 and FIG. 3, the resulting antenna diagram is shown in FIG. 5. Here, the ideal, desired, antenna diagram is shown with a dotted curve 12, and the observed, received signal is shown with a dashed curve 13. This dashed curve 13 corresponds to the solid curve 11 in FIG. 3. The appearance of the resulting antenna diagram after that the disturbance has been eliminated according to the method above is shown with a solid curve 14.

Figure 4:
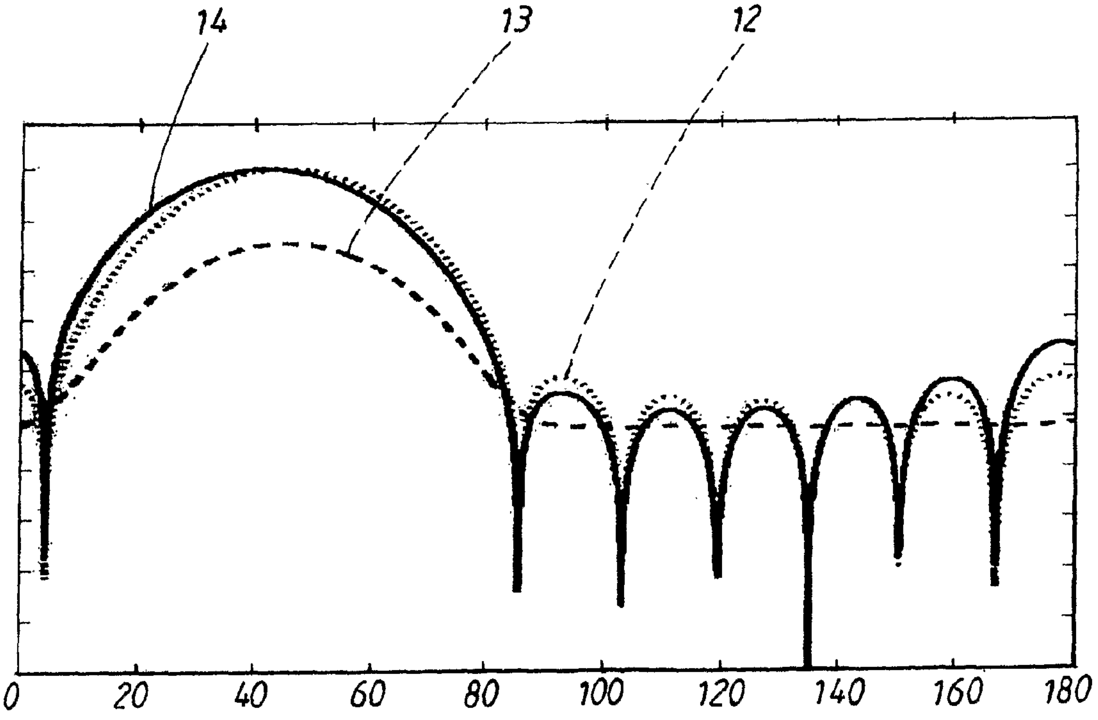
FIG. 4 shows a plot of a second set of antenna diagrams.

As apparent from FIG. 4, the ideal antenna diagram 12 deviates from the resulting antenna diagram, since one of the zeroes has been removed, the resulting antenna diagram 14 will deviate from the ideal antenna diagram 12. The deviation is manifested by a bias in main beam pointing direction; the resulting antenna diagram 14 has a main beam pointing angle of a lower value than the ideal antenna diagram 12.

In FIG. 4 a flowchart for interference cancellation method is outlined.

15: First, disturbing signals, manifested by clusters, are identified using a pole model.

16: Then, with reference to FIG. 2, distances d between zeroes and poles are calculated. The reason for this is that the zero closest to a pole in question shall be used to cancel, which actually is carried out in step 17 below.

17: A match function V(x) is minimized for each cluster to cancel. The match function V(x) produces as a result which zeroes that are closest to the poles in question. Thus zeroes and poles are matched according to the match function V(x). More specifically, for a certain pole, the match function V(x) will produce different values of the distance d for different zeroes. The zero corresponding to the distance d having the smallest magnitude is chosen. Here, x denotes a vector comprising zeroes and poles.

18: Then the new zeroes are used to compute new array weights.

19: Finally, the new array weights are used to cancel the undesired disturbers, being manifested by clusters.

The present invention is not limited to the embodiments above, but may vary freely within the scope of the appended claims. For example, the cluster comprising disturbing signals may comprise any sources, where any cluster is a collection of scatterers which are close to the transmitting mobile station, where the term "close" shall be interpreted as a distance which corresponds to a time which is much smaller than the symbol time.

There base stations used may be of any suitable kind, and may comprise several ULA antennas each, such that certain sectors are covered by the ULA antennas.

The ULA antennas may be of any suitable kind, for example patch antennas, slot antennas, slot fed patches or dipole antennas.

Equation (5) may be derived by means of a least squares method or a Fourier transform.

The invention claimed is:

1. A method for identifying components in a telecommunication system, which method comprises the steps:

representing a uniform linear array, ULA, antenna, having at least two antenna elements, by an array factor polynomial, the polynomial comprising at least two terms, each term having a certain weight ($w_k$);

setting said weights ($w_k$) to desired values such that a desired antenna radiation pattern corresponding to a desired array factor polynomial is acquired for the ULA antenna;

wherein the method comprises the steps:

changing the desired weights such that a number of sets of desired weights ($w_k$) is acquired, such that the ULA antenna scans a spatial portion, a certain scan corresponding to a certain set of desired weights, and the number of scans at least being equal to the number of antenna elements in the ULA antenna;

analyzing a received signal ($h_0$) obtained from said scans, the received signal ($h_0$) being represented by a received array factor polynomial comprising at least two terms, each term having a certain received weight, such that a received set of weights is acquired, the received set of weights being constituted by the desired set of weights ($w_k$) scaled and rotated, the received array factor polynomial further being parameterized by at least one pole; and using each corresponding set of desired weights ($w_k$) and received weights to determine the pole parameterization.

2. A method according to claim 1, wherein the desired array factor polynomial is parameterized by at least two zeroes, where at least one zero is used for cancelling out a pole by altering the desired weights ($w_k$) such that said zero is moved to said pole.

3. A method according to claim 2, wherein a pole cancellation procedure comprises the following steps:

identifying poles in a pole model;

calculating distances (d) between zeroes and poles;

minimizing a match function (V(x)) for each pole cancellation, the match function (V(x)) producing as a result which zeroes that are closest to the poles in question, allowing zeroes and poles to be matched according to the match function (V(x)), meaning that for a certain pole, the match function (V(x)) will produce different values of the distance (d) for different zeroes, and the zero corresponding to the distance (d) having the smallest magnitude is chosen;

using the new zeroes to compute new array weights; and using the new array weights to cancel the poles in question.

4. A method according to claim 2 wherein each pole corresponds to a disturbance enabling each disturbance to be cancelled out by cancelling out its corresponding pole.

5. A method according to claim 4, wherein the received signal ($h_0(n)$) in the spatial domain may be written as $$h_o(n) = \sum_{k=0}^{K-1}\left(w_k\left[\sum_{l=0}^{L} c_l^k\right]\delta(n-k)\right) = \sum_{k=0}^{K-1}\left(w_k\left[\sum_{l=0}^{L}(|c_l|e^{j\arg c_l})^k\right]\delta(n-k)\right)$$

where each $c_l$ is a complex value corresponding to a certain pole, where $|c_l|$ relates to the width of the disturbance and arg $c_l$ corresponds to the relative azimuth direction to the disturbance, and where n is a spatial variable, $\delta(n-k)=1$ for n=k, otherwise $\delta(n-k)=0$, K is the number of antenna elements in the ULA antenna and L is an integer satisfying $L \leqq K-2$.

6. A method according to claim 5, wherein the expression for the received signal ($h_0(n)$) in the spatial domain is derived by means of a least squares method or a Fourier transform.

7. A method according to claim 5, wherein in order to determine the pole parameterization, each complex value ($c_l$) is calculated using a maximum likelihood estimation.

* * * * *

UNITED STATES PATENT AND TRADEMARK OFFICE

CERTIFICATE OF CORRECTION

PATENT NO. : 8,249,534 B2
APPLICATION NO. : 12/745801
DATED : August 21, 2012
INVENTOR(S) : Lindgren It is certified that error appears in the above-identified patent and that said Letters Patent is hereby corrected as shown below:

On the Title Page, in Field (73), under "Assignee", in Column 1, Line 2, delete "(DE)" and insert -- (SE) --, therefor.

In Fig. 3, Sheet 2 of 3, delete " 60 8 " and insert -- 60 80 --, therefor.

In Column 4, Lines 57-60, in Equation (6), delete " $\sum_{k=0}^{K-1}(w_k(|c|e^{j\arg c}z)^k \Rightarrow H_o(z)$ $\sum_{k=0}^{K-1}(w_k z^k)$, " and insert -- $\sum_{k=0}^{K-1}(w_k(|c|e^{j\arg c}z)^k) \Rightarrow H_o(z) = \sum_{k=0}^{K-1}(w_k z^k)$, --, therefor.

In Column 5, Line 24, in Equation (7), delete " $\left[\sum_{k=0}^{K-1}(|c_l|e^{k\arg c_l})^k\right]$ " and Signed and Sealed this
Eighteenth Day of December, 2012

David J. Kappos
*Director of the United States Patent and Trademark Office* insert -- $\left[\sum_{l=0}^{L}(|c_l|e^{j\arg c_l})^k\right]$ --, therefor.

In Column 5, Line 40, in Equation (8), delete " $\frac{w_0 h_0(1)}{w_1 h_0(0)}$ " and insert -- $\frac{w_0}{w_1}\frac{h_0(1)}{h_0(0)}$, --, therefor.